United States Patent [19]

Henmi et al.

[11] 4,283,360

[45] Aug. 11, 1981

[54] PROCESS FOR PRODUCING MOLDED CERAMIC OR METAL

[75] Inventors: Ichiro Henmi; Akinori Noda; Takuro Ono, all of Yokohama, Japan

[73] Assignee: Asahi Glass Company, Ltd., Tokyo, Japan

[21] Appl. No.: 119,440

[22] Filed: Feb. 7, 1980

[30] Foreign Application Priority Data

Feb. 28, 1979 [JP] Japan .................................. 54-21997

[51] Int. Cl.³ ............................................. C04B 35/64
[52] U.S. Cl. ...................... 264/63; 264/221
[58] Field of Search ............................ 264/63, 221, 44

[56] References Cited

U.S. PATENT DOCUMENTS

| | | | |
|---|---|---|---|
| 3,339,622 | 9/1967 | Horton | 264/221 |
| 3,608,046 | 9/1971 | Philips | 264/221 |
| 4,067,943 | 1/1978 | Ezis et al. | 264/221 |
| 4,104,345 | 8/1978 | Anderson | 264/63 |
| 4,197,118 | 4/1980 | Wiech | 264/63 |

*Primary Examiner*—John Parrish
*Attorney, Agent, or Firm*—Oblon, Fisher, Spivak, McClelland & Maier

[57] ABSTRACT

An organic solvent soluble resin and insoluble resin, and a ceramic powder or a metallic powder, if desired, a plasticizer and a desired additive are blended and molded and a molded product is treated with an organic solvent to dissolve the soluble resin, the plasticizer etc. and then, the treated product is fired to obtain a molded ceramic or metal having no cracking nor deformation and having high density.

9 Claims, No Drawings

PROCESS FOR PRODUCING MOLDED CERAMIC OR METAL

BACKGROUND OF THE INVENTION

1. Field of the Invention

The present invention relates to a process for producing a molded ceramic or metal which is obtained by blending a resin to a ceramic powder or a metallic powder and molding the mixture into a desired configuration and then removing the resin from the molded product.

2. Description of the Prior Arts

Recently, ceramics have been widely used for various products from industrial articles to electronics parts. Severe size accuracy, physical properties and configuration accuracy of ceramic articles have been required.

It has been required to obtain desired ceramic products by blending a ceramic to a desired resin to give a plasticity and molding the mixture by an injection molding and decomposing the resin included in the molded product and firing it so as to attain the requirements. These processes have been practically applied.

The most important advantages in these processes are to prevent a formation of crackings in the molded product in an injection molding and to remove the resin without crackings, an expansion and a deformation.

Heretofore, various resin have been proposed. Styrene type resin compositions and atactic polypropylene type resin compositions have been mainly used and several kinds of the products have been proposed. Certain resin compositions have been practically used. In order to remove the resins from the molded products, it has been taken care of the treatment only by heating the molded product at a rate of elevating the temperature per unit time during several tens to several hundreds hours so as to prevent the formation of crackings, an expansion or a deformation in a molded product.

However, in spite of such cares, the crackings or the expansion are relatively easily caused in the molded product in the conventional process. These processes are not industrially satisfactory.

SUMMARY OF THE INVENTION

It is an object of the present invention to provide a process for producing a molded ceramic or metal by removing a resin under reducing a removement of a resin in a firing.

It is another object of the present invention to prevent a deformation of a molded product caused by a firing.

It is the other object of the present invention to provide a dense product by firing a molded product.

The foregoing and other objects of the present invention have been attained by blending a ceramic powder or a metallic powder to certain kinds of resins which include an organic solvent soluble resin and an organic solvent insoluble resin for the same solvent; molding the mixture to obtain a molded product; dissolving the organic solvent soluble resin into the solvent by contacting the molded product with the solvent; and then, removing the organic solvent insoluble resin by a firing.

It is preferable to incorporate a plasticizer in the blended mixture so as to efficiently dissolve the organic solvent soluble resin as well as to improve a moldability and to increase a density.

DETAILED DESCRIPTION OF THE PREFERRED EMBODIMENTS

It is preferable to incorporate a plasticizer and a lubricant in a mixture of a ceramic powder or a metallic powder and said two kinds of the organic solvent soluble resin and insoluble resin.

The organic solvents used in the process of the present invention should be inert to and not to dissolve the ceramics as the component of the molded product and are preferably easily available, relatively economical and easily handled without an explosion.

The resins to be soluble in an organic solvent or the resins to be insoluble in an organic solvent are classified depending upon the conditions.

The following combinations can be considered as optimum examples. The combinations of the organic solvent soluble or insoluble resins with the solvent can be selected.

The following shows typical combinations to be selected.

The solvents used in the present invention are classified as follows.

(1) Aromatic hydrocarbons;
   benzene, toluene and xylene;
(2) Substituted aromatic hydrocarbons;
   nitrobenzene, phenol, m-cresol, chlorobenzene, bromobenzene and o-dichlorobenzene;
(3) Halohydrocarbons:
   chloroform, methylene chloride, dichloroethane and diiodoethane;
(4) Ketones:
   acetone, methyl ethyl ketone and methyl isobutyl ketone;
(5) Esters:
   ethyl acetate and butyl acetate;
(6) Cycloethers:
   tetrahydrofuran and dioxane;
(7) Aprotic dipolar solvents:
   N,N-dimethyl formamide, N-methyl-2-pyrrolidone and dimethyl sulfoxide;
(8) Alcohols:
   methanol, ethanol, propanol and butanol; and
(9) Aliphatic hydrocarbons:
   propane, butane, hexane, octane, decane, propene, butene, hexene, octene and decene.

The solubility of each resin into each solvent can be easily found by a simple test. The following shows the solubilities of resins in solvents.

Organic solvent insoluble type resins

Polyalkenes:
   Polyethylene, polypropylene, poly-4-methyl-1-pentene; and polybutene.
   Insoluble in the solvents (1) to (9);
Polyvinyl alcohols:
   Insoluble in the solvent (1) to (9);
Polyacetals:
   Insoluble in the solvent (1), (4), (5), (8), or (9).
Polyvinyl butyrals:
   (more than 70% of acetal degree)
   Insoluble in the solvent (1), (5), or (9).
Polyvinyl butyrals:
   (less than 70% of acetal degree)
   Insoluble in the solvent (1), (2), (3), (4), (5), (6), (8), or (9).
Polycarbonates:
   Poly(oxycarbonyl-1,3-phenylene);

Poly(oxycarbonyl-1,4-phenylene).
 Insoluble in the solvent (1) to (9);
Poly(oxyethyleneoxyterephthaloyl).
 Insoluble in the solvent (3) to (5) and (8) and (9).
Thermoplastic polyurethane:
 Insoluble in the solvent (1), (2), (3), (4), (5), (6), (8), and (9).
Polyamides:
 (1) 4-Nylon: Insoluble in the solvent (1), (3), (4), (5), (6), and (7).
 (2) 6-Nylon: Insoluble in the solvent (1), (3), (4), (5), (8), and (9).
 (3) 6,6-Nylon: Insoluble in the solvent (1), (3), (4), (5), and (9).
 (4) 6,10-Nylon: Insoluble in the solvent (1), (3), (4), (5), (6), (7), (8), and (9).
 (5) 11-Nylon: Insoluble in the solvent (1), (2), (3), (4), (5), (6), (8), and (9).
Polyvinylidene chloride:
 Insoluble in the solvent (1), (2), (8), and (9).

Organic solvent soluble type resins

Polystyrene; ABS and AS;
 (acrylonitrile-butadiene-styrene; acrylonitrile-styrene)
 Soluble in the solvent (1), (2), (3), (4), (5), (6), (7), and (9).
Polyvinyl chloride and copolymers:
 Soluble in the solvent (1), (2), (3), (4), (5), (6), and (7).
Polyacrylate and copolymers:
 Soluble in the solvent (1), (2), (3), (4), (5), (6), and (7).
Polymethacrylate and copolymers:
 Soluble in the solvent (1), (2), (3), (4), (5), (6), (7), and (8).
Polyvinyl acetate: and Polyethylene-vinyl acetate:
 Soluble in the solvent (1), (2), (3), (4), (5), (6), (7), and (8).
Acetyl cellulose:
 Soluble in the solvent (2), (3), (4), (5), (7), and (8).
Polyesters:
 Polyethyleneterephthalate
 Polybutyreneterephthalate
 Soluble in the solvent (1), (2), (3), (4), (5), (6), and (7).
Polycarbonates:
 Poly(oxycarbonyloxy-1,4-phenyleneisopropylidene-1,4-phenylene)
 Soluble in the solvent (2), (3), (6), and (7).
 Poly(oxycarbonyloxy-1,4-phenylene-2-pentylidene-1,4-phenylene)
 Soluble in the solvent (1), (2), (3), (5), (6), and (7).
Polyphenylene oxides:
 Soluble in the solvent (1), (2), and (3).

Solubilities of the resins in the solvents are depending upon molecular weights of the resins and temperatures and other factors. Thus, it is easily understood by simple tests.

In the selection of the combination of the organic solvent soluble resin and the organic solvent insoluble resin, it is preferable to form a matrix of the organic solvent soluble resin.

It is preferable to blend a plasticizer for the organic solvent soluble resin, so that the molding operation is smoothly performed and the resin is easily dissolved from the molded product and the density of the product obtained by firing is increased without crackings.

The plasticizers can be selected by referring to the description of Encyclopedia of Polymer Science and Technology; Vol. 10 Pages 228 to 306.

Typical plasticizers include phosphoric esters such as tricresyl phosphate, triphenyl phosphate and cresyl diphenyl phosphate; phthalic esters such as butyl octyl phthalate, dibutyl phthalate, dicyclohexyl phthalate, diethyl phthalate, dihexyl phthalate, diisodecyl phthalate, di-2-methoxyethyl phthalate, dimethyl phthalate, ditridecyl phthalate, di-2-ethylhexyl phthalate, diisooctyl and mixed octyl phthalate, n-octyl n-decyl phthalate, isooctyl isodecyl phthalate and other phthalic esters; trimellic esters; other aromatic plasticizers; adipic esters such as diisodecyl adipate, di-2-ethylhexyl adipate, octyl decyl adipate, diisobutyl adipate, diisooctyl adipate and other adipates; azelaic esters; complex linear polyesters and polymeric plasticizers; epoxidized esters such as epoxidized soya oil and octyl epoxy tallate; dibutyl maleate; glyceryl monoricinoleate; isopropyl myristate; isopropyl palmitate; oleic esters such as butyl oleate, glyceryl trioleate, methyl oleate, n-propyl oleate and isopropyl oleate; phosphoric esters; sebacic esters such as dibutyl sebacate and di(2-ethylhexyl) sebacate; stearic esters such as n-butyl stearate; other stearic esters and stearic acid; and triethylene glycol di(caprylate-caprate). The other plasticizer can be used depending upon the resins especially the organic solvent soluble resins.

A rate of the organic solvent soluble resin to the insoluble resin is preferably in a range of 95 to 30 wt.%: 5 to 70 wt.%. When the former is less than 30 wt.% and the latter is more than 70 wt.%, the disadvantages of the conventional process are found, whereas when the former is more than 95 wt.% and the latter is less than 5 wt.%, deformation or break of the injection molded product may be caused by handling the molded product.

It is especially preferable to combine 85 to 40 wt.% of the soluble resin and 15 to 60 wt.% of the insoluble resin. The deformation or breaking of the injection molded product is not found and the operation for removing the resins is easy and a cracking or expansion is not caused.

It is preferable to use polystyrene, polyvinyl chloride or polyoxy-1,4-phenylenesulfonyl-1,4-phenylene as the organic solvent soluble resin and to use polyethylene, polypropylene (isotactic) or polyvinyl alcohol as the organic solvent insoluble resin, since the injection moldability is remarkably good and a cracking or expansion is not caused. It is especially preferable to use said resins in the present invention. When the resin is dissolved with the organic solvent, it is possible to use two or more kinds of the solvents and to dissolve the resins in sequence by each of them.

In the present invention, the resin can be used with a plasticizer and a parting agent and also a filler if no trouble is caused. The incorporation of the plasticizer is especially preferable. A ratio of the plasticizer to the resin is depending upon conditions of the injection molding and kinds and amounts of the resins and a ratio of the ceramic powder or metallic powder to the resin and is preferably, in a range of 1 to 50 wt.%: 99 to 50 wt.% especially 3 to 30 wt.%: 97 to 70 wt.%.

Suitable ceramics used in the present invention include silicon nitride, alumina, zirconia, silicon carbide, cordierite, tungsten carbide, aluminum nitride, aluminum titanate, zircon and mullite.

The process of the present invention can be also applied for an injection molding using a metallic powder, instead of the ceramic powder.

Suitable metallic powder include silicon, titanium and zirconium.

The molding method is not critical and is preferably an injection molding or an extrusion molding and like to impart advantageous results.

A volumetric ratio of the ceramic powder or the metallic powder to the total mixture is selected so as to form a moldable mixture and is preferably in a range of 25 to 75 vol.% especially 38 to 55 vol.%. When it is less than 25 vol.%, the amount of the resins is too small to perform a molding operation whereas when it is more than 75 vol.%, a shrinkage in the firing step is too large to remove the soluble resin and to control the size accuracy of the molded product.

The injection molding machine or the extrusion molding machine and the molding method are not critical and can be selected from the conventional machines and methods.

In the treatment of the molded product, the molded product is dipped into a bath of the organic solvent so as to dissolve the soluble resin from the molded product into the solvent. It is possible to stir the organic solvent or to apply the ultrasonification or to accelerate the dissolution by the other method unless the molded product is deformed or broken.

In the process of the present invention, the residual resin is removed by the firing method. In the firing step, it is usual to heat the molded product at about 350° to 450° C. at a rate of about 50° C./hour from a room temperature to about 250° C.; and at a rate of about 100° C./hour from about 250° C. to about 450° C. and to heat it at about 450° C. for about 1 hour. The temperature and the condition for the firing can be varied depending upon the kinds of the resin especially the insoluble resin.

An apparatus for the firing can be a hot air recycling type electric furnace. It is also possible to heat the molded product, in the firing step, at a temperature for not only the removement of the residual resins, but also a calcination, and a sintering of the ceramic powder or the metallic powder.

The effect of the plasticizer is also found in the firing step.

Soluble times of resins have been studied.

The soluble time is measured by molding each resin by an extrusion molding to form pellets having a sectional area of 4×4 mm (2.5 g.) and having no porosity and stirring vigorously 2.5 g. of the pellets of the resin in 50 g. of each solvent at 20° to 50° C. and measuring the time to dissolve all of the resin.

The soluble resins used in the present invention should have the soluble time of shorter than 100 hours preferably shorter than 50 hours.

The insoluble resins used in the present invention should have the soluble time of longer than 100 hours.

The present invention will be further illustrated by certain examples and references which are provided for purposes of illustration only and are not intended to be limiting the present invention.

EXAMPLE 1

In an autoclave kneader, 76.4 wt.% (50 vol.%) of silicon nitride powder, 15.3 wt.% of polystyrene, 3.8 wt.% of polyethylene, 2.8 wt.% of stearic acid and 1.7 wt.% of diethyl phthalate were charged and kneaded at 180° C. under a pressure of 2.5 atm. and the mixture was pelletized to form pellets having diameters of 3 to 5 mm. An injection molding of the pellets was carried out by an injection molding machine at 250° C. of a heated cylinder temperature under 1 ton/cm$^2$ of an injection pressure and at 50° C. of a mold temperature to obtain a plate having a size of 60 mm×100 mm×8 mm. The resulting plate was dipped into methylene chloride filled in a 2 liter tank with a cover at 15° C. for 40 hours. It was found that about 93 wt.% of the total of polystyrene, stearic acid and diethyl phthalate was dissolved by a measurement of the weight loss of the product. No cracking nor deformation of the product was found. The product was fired in nitrogen atmosphere by heating at a rate of 200° C./hour from a room temperature to 1750° C. to remove the residual resins and to sinter the product. The sintered product had no cracking nor deformation.

The soluble time of the polystrene in methylene chloride was 0.15 hour at 30° C. whereas the soluble time of the polyethylene in methylene chloride was longer than 100 hours at 50° C.

EXAMPLE 2

In accordance with the process of Example 1, pellets were prepared by using 77.3 wt.% (52 vol.%) of silicon nitride powder, 13.8 wt.% of polyvinyl chloride, 5.9 wt.% of polypropylene (isotactic), 1.5 wt.% of diethyl phthalate and 1.5 wt.% of stearic acid and an injection molding of the pellets was carried out to obtain a molded plate.

The resulting molded plate was dipped into tetrahydrofuran filled in the tank of Example 1 at 15° C. for 41 hours.

It was found that about 92 wt.% of the total of polyvinyl chloride, stearic acid and diethyl phthalate was dissolved by a measurement of the weight loss of the product. No cracking nor deformation of the product was found.

In accordance with the process of Example 1, a sintered product was prepared. The sintered product had no cracking nor deformation.

The soluble time of the polyvinyl chloride in tetrahydrofuran was 0.67 hour at 20° C. whereas the soluble time of the isotactic polypropylene in tetrahydrofuran was longer than 100 hours at 50° C.

EXAMPLES 3 to 7 and REFERENCES 1 to 4

In accordance with the process of Example 1 except using the resins and the ceramic powder or the metallic powder and plasticizers and the other additive shown in Table and varying the conditions, sintered products were prepared. The results are shown in Table.

TABLE

| Example | Exp. 3 | Exp. 4 | Exp. 5 | Exp. 6 | Exp. 7 |
|---|---|---|---|---|---|
| Solvent | EA | MCl | EA | MCl | MEK |
| Insoluble resin | | | | | |
| Kind | PE | PP | PAc | PE | PE |
| Soluble time at 50° C. (hr.) | >100 | >100 | >100 | >100 | >100 |
| Amount (wt. %) | 20 | 28 | 43 | 15 | 30 |
| Soluble resin | | | | | |
| Kind | PVAc | PSt | PVAc | PMMA | CeAc |
| Soluble time at 30° C. (hr.) | 5 | 0.15 | 5 | 20 | 1 |
| Amount (wt. %) | 60 | 57 | 44 | 63 | 55 |
| Plasticizer | | | | | |
| Kind | TPo | DEPha | NBPh | DEGB | DMPha |
| Amount (wt. %) | 12 | 9 | 7 | 9 | 9 |

| | | | | | |
|---|---|---|---|---|---|
| Kind | SA | SA | SA | SA | SA |
| Amount (wt. %) | 8 | 6 | 6 | 6 | 6 |
| Ceramic or metal | | | | | |
| Kind | Si | Al₂O₃ | SiC | Cord | SiN |
| Amount (wt. %) | 56 | 60 | 70 | 48 | 30 |
| **Result*¹** | | | | | |
| Moldability and resin removement | A | A | A | A | A |
| Sintering | A | A | A | A | A |

| | | | | |
|---|---|---|---|---|
| Reference | Ref. 1 | Ref. 2 | Ref. 3 | Ref. 4 |
| Solvent | MCl | MCl | MCl | MCl |
| Insoluble resin | | | | |
| Kind | PSt | PSt | PSt | PSt |
| Soluble time at 50° C. (hr.) | >100 | >100 | >100 | >100 |
| Amount (wt. %) | 16 | 16 | 58 | 1.5 |
| Soluble resin | | | | |
| Kind | PSt | PSt | PSt | PSt |
| Soluble time at 30° C. (hr.) | 0.15 | 0.15 | 0.15 | 0.15 |
| Amount (wt. %) | 61 | 61 | 19 | 75.5 |
| Plasticizer | | | | |
| Kind | DETP | DETP | DETP | DETP |
| Amount (wt. %) | 14 | 14 | 14 | 14 |
| Kind | SA | SA | SA | SA |
| Amount (wt. %) | 9 | 9 | 9 | 9 |
| Ceramic or metal | | | | |
| Kind | SiN | SiN | SiN | SiN |
| Amount (wt. %) | 78 | 22 | 55 | 55 |
| Result | | | | |
| Moldability and resin removement | C*² | A | B | C*⁵ |
| Sintering | — | C*³ | B*⁴ | — |

Note:
Solvent:
EA: ethyl acetate
MCl: methylene chloride
MEK: methyl ethyl ketone
Insoluble resin:
PE: polyethylene
PP: polypropylene
PAc: polyacetal
Soluble resin:
PVAc: polyvinylacetate
PSt: polystyrene
PMMA: polymethyl methacrylate
CeAc: cellulose acetate
Plasticizer:
TPo: triphenyl phosphate
SA: stearic acid
DEPha: diethyl phthalate
NAPh: 2-nitrobiphenyl
DEGB: diethyleneglycol dibenzoate
DMPha: dimethyl phthalate
DETP: diethyl terephthalate
Ceramics and metal:
Si: silicon
Al₂O₃: alumina
SiC: silicon carbide
Cord.: cordierite
SiN: silicon nitride
Result:
*¹A: excellent
  B: disadvantage
  C: serious trouble
*²An injection molding was incapable.
*³A deformation of a molded product was caused in the injection.
*⁴Fine crackings are formed in the sintering.
*⁵A deformation of a molded product was caused in the resin removing step.

We claim:
1. In a process for producing a molded ceramic or metal by mixing a ceramic powder or metallic powder with a resin, molding the mixture and firing the molded product, the improvement consisting of:
    blending an organic solvent soluble resin and an organic solvent insoluble resin as said resin which is mixed with a ceramic or metallic powder;
    prior to firing, treating the molded product by immersion in a liquid organic solvent to dissolve said organic solvent soluble resin; and
    then, firing the so-treated molded product to remove residual resin.
2. A process according to claim 1 wherein said organic solvent is selected from the group consisting of aromatic hydrocarbons, substituted aromatic hydrocarbons, halogenated hydrocarbons, ketones, esters, cycloethers, aprotic dipolar solvents, alcohols and aliphatic hydrocarbons to dissolve said organic solvent soluble resin.
3. A process according to claim 1 wherein a plasticizer is incorporated in the mixture.
4. A process according to claim 3 wherein said plasticizer is miscible to at least said organic solvent soluble resin.
5. A process according to claim 1 or 3 wherein the volumetric ratio of said ceramic powder and/or said metallic powder to the total of the mixture is in the range of 25 to 75 vol.%.
6. A process according to claim 1 or 3 wherein the weight ratio of said organic solvent soluble resin to said organic solvent insoluble resin is in the range of 95 to 30 wt.%: 5 to 70 wt.%.
7. A process according to claim 1 or 3 wherein said ceramic powder is silicon nitride, alumina, zirconia, silicon carbide, cordierite, tungsten carbide, aluminum nitride, aluminum titanate, zircon or mullite.
8. A process according to claim 1 or 3 wherein said metallic powder is silicon, titanium or zirconium.
9. A process according to claim 1 or 3 wherein said organic solvent soluble resin is a resin which dissolves at a ratio of 5% by weight in said solvent at 20° to 50° C. in less than 100 hours.

* * * * *